United States Patent Office 3,072,601
Patented Jan. 8, 1963

3,072,601
STABILIZATION OF POLYOLEFINS
David S. Breslow, Madelyn Gardens, Wilmington, Del., assignor to Hercules Powder Company, Wilmington, Del., a corporation of Delaware
No Drawing. Filed Aug. 11, 1960, Ser. No. 48,826
2 Claims. (Cl. 260—45.75)

The present invention relates to polyolefin compositions and, more particularly, to the stabilization of stereoregular polymers of propylene and higher α-olefins against degradation by light.

Highly crystalline, high molecular weight stereoregular polymers of propylene and higher α-olefins are well known. One of the deficiencies of such polymers which must be overcome to enable their use in many applications is poor stability against the deleterious effect of light.

It is disclosed in Belgian Patent 579,636 that bis(p-alkylphenol) sulfides in which all or part of the phenolic hydrogen atoms have been replaced by nickel are effective light stabilizers for stereoregular polypropylene. However, such stabilizers have the disadvantage of causing polypropylene, and other polymers, to darken in color when heated to a temperature of about 260–275° C. While in many applications this is an insignificant disadvantage, there are some applications in which it is desirable, or even necessary, to heat a polymer to a higher temperature than 260–275° C.

In accordance with the present invention it has been found that the stereoregular polymers of propylene and higher α-olefins can be stabilized very effectively against the deleterious effects of light by incorporating in such polymers, as a stabilizer, a small amount of a bis(p-alkylphenol) sulfoxide or sulfone in which part or all of the phenolic hydrogen atoms have been replaced by nickel, and that a polymer containing such a stabilizer can be heated to a higher temperature without darkening than can a polymer containing one of the stabilizers of the aforesaid Belgian patent.

Although any stereoregular polymer of a mono-α-olefin having at least 3 carbon atoms can be stabilized by means of the invention, the invention is particularly useful in stabilizing stereoregular polymers of monoolefins having from 3 to 6 carbon atoms including, for instance, polypropylene, poly(butene-1), poly(pentene-1), poly(3-methylbutene-1), and poly(4-methylpentene-1).

The nickel compounds used as additives in accordance with the invention increase the light stability of stereoregular polypropylene and related stereoregular polymers quite markedly. An even further increase in light stability and heat stability can be achieved, however, by also incorporating a phenolic compound in the polymer. In fact, such outstanding light and heat stability is obtained that it makes these stereoregular polymers useful in many applications requiring prolonged outdoor exposure in milder climates.

The nickel compounds used as stabilizers in accordance with the invention are generically termed herein as "nickel phenolates" of bis(p-alkylphenol) sulfoxides and bis(p-alkylphenol) sulfones. More particularly, these compounds have formulae which differ from the compounds depicted in the drawing of the aforesaid Belgian patent by replacement of the —S— radical with a

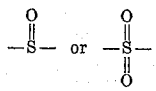

radical. The quoted term is inclusive of both full nickel phenolates, in which all of the phenolic hydrogens of the sulfoxide or sulfone are replaced by nickel, and nickel phenolphenolates, in which some but not all of the phenolic hydrogens are replaced by nickel.

Both the full nickel phenolates and nickel phenolphenolates can be prepared by reacting a hydrated nickel salt of a weak acid with a bis(p-alkylphenol) sulfoxide or sulfone, or by reacting a nickel halide with a sodium salt of a bis(p-alkylphenol) sulfoxide or sulfone in anhydrous medium using the techniques described in the aforementioned Belgian patent for making the corresponding compounds of bis(p-alkylphenol) sulfides. The bis(p-alkylphenol) sulfoxides and sulfones can be made by oxidation of the corresponding sulfides. Bis(p-amylphenol) sulfoxide can be made, for example, by oxidizing bis(p-amylphenol) sulfide with hydrogen peroxide in acetic acid using the technique shown by Wagner and Zook, Synthetic Organic Chemistry, New York, Wiley and Sons (1953). Bis(p-amylphenol) sulfone can be made by oxidizing the above sulfide or sulfoxide with hydrogen peroxide in acetic acid using the same technique.

More particularly, the nickel phenolates are those of bis(p-alkylphenol) sulfoxides and sulfones in which the alkyl group contains at least 2 carbon atoms. Exemplary of these sulfoxides and sulfones are o,o'-bis(p-ethylphenol) sulfoxide, o,o'-bis(p-ethylphenol) sulfone, o,o'-bis(p-isopropylphenol) sulfoxide, o,o'-bis(p-isopropylphenol) sulfone, o,o'-bis(p-menthylphenol) sulfoxide, o,o'-bis(p-amylphenol) sulfoxide, o,o'-bis(p-amylphenol) sulfone, o,o'-bis(p-tetramethylbutylphenol) sulfoxide, o,o'-bis(p-tetramethylbutylphenol) sulfone, o,o'-bis(p-cyclohexylphenol) sulfoxide, o,o'-bis(p-dodecylphenol) sulfoxide, and o,o'-bis(p-dodecylphenol) sulfone.

In the following examples parts and percentages are by weight unless otherwise specified.

EXAMPLES 1–4

In these examples different portions of stereoregular polypropylene having a birefringent melting point of about 168° C. and a reduced specific viscosity of 3.5 (measured on a 0.1% solution of decahydronaphthalene at 135° C.) were thoroughly blended with 0.5%, based on the amount of polypropylene, of a nickel phenolate of a bis(p-alkylphenol) sulfoxide or sulfone. Each blend was extruded into molding powder at 210° C. and the molding powder was then pressed into sheets 25 mils thick. Strips cut from these sheets, and 0.5 inch wide, were fastened onto pieces of white cardboard and placed in a Fade-Ometer. Another series of strips was exposed to outdoor weathering in Miami, Florida, at a 45° angle facing south. In both the Fade-Ometer exposure and the outdoor exposure, the development of brittleness in each strip was observed by periodically examining the strip and noting the time elapsed until it became brittle, the embrittlement point being the time elapsed until a strip breaks when bent double. Composition and exposure data are as follows:

Table I

| Example No. | Stabilizer | Embrittlement Time | |
|---|---|---|---|
| | | Fade-Ometer, hours | Outdoors |
| 1 | Full Ni phenolate of o-o'-bis(p-tetramethylbutylphenol) sulfoxide. | 271 | 1½ mo. |
| 2 | Ni phenol-phenolate of o,o'-bis(p-amylphenol) sulfoxide (7.3% Ni). | 230 | 1½ mo. |
| 3 | Full Ni phenolate of o,o'-bis(p-tetramethylbutylphenol) sulfone. | 271 | 1½ mo. |
| 4 | Ni phenol-phenolate of o,o'-bis(p-amylphenol) sulfone (7% Ni). | 230 | 1½ mo. |
| Control | (No stabilizer) | 24 | 1 week. |

EXAMPLES 5–8

The same procedure as in the preceding examples was followed except in this case the polymer additionally contained 0.5% of the reaction product of 2 moles of nonylphenol and 1 mole of acetone, the reaction product comprising a mixture of isopropylidene-bis(nonylphenol) and 2(2' - hydroxyphenyl) - 2,4,4 - (trimethyl - 5',6 - dinonylchroman). Data are as follows:

*Table II*

| Example No. | Stabilizer | Embrittlement Time | |
|---|---|---|---|
| | | Fade-Ometer, hours | Outdoors |
| 5 | Full Ni phenolate of o,o-bis(p-tetramethylbutylphenol) sulfoxide. | 458 | 2½ mo. |
| 6 | Ni phenol-phenolate of o,o-bis(p-amylphenol) sulfoxide (7.3% Ni). | 320 | 2½ mo. |
| 7 | Full Ni phenolate of o,o-bis(p-tetramethylbutylphenol) sulfone. | 399 | 2½ mo. |
| 8 | Ni phenol-phenolate of o,o-bis(p-amylphenol) sulfone (7% Ni). | 330 | 2½ mo. |
| Control | (No Ni phenolate) | 48-72 | 2 weeks. |

EXAMPLES 9–12

In these examples, the ability of the nickel compounds of the invention to withstand higher processing temperatures than the nickel phenolates of bis(p-alkylphenol) sulfides is demonstrated. This was done by the stepwise injection molding of the compositions of Examples 1 to 4 in a Minijector molding machine in a sequence of experiments, each with a hold-up period of 15 minutes, the temperature being increased stepwise. The following table shows the lowest temperature at which each composition turned dark gray in color.

*Table III*

| Example No. | Stabilizer | Darkening Temp. (° C.) |
|---|---|---|
| 9 | Full Ni phenolate of o,o-bis(p-tetramethylbutylphenol) sulfoxide. | 290 |
| 10 | Ni phenol-phenolate of o,o-bis(p-amylphenol) sulfoxide (7.3% Ni). | 290 |
| 11 | Full Ni phenolate of o,o-bis(p-tetramethylbutylphenol) sulfone. | 305 |
| 12 | Ni phenol-phenolate of o,o-bis(p-amylphenol) sulfone (7% Ni). | 305 |
| Control | [Full Ni phenolate of o,o-bis(p-tetramethylbutylphenol) sulfide]. | 275 |
| Control | [Ni phenol-phenolate of o,o-bis(p-amylphenol) sulfide]. | 275 |

The amount of the nickel phenolate incorporated in the polymer can be varied from a very small amount up to several percent. More specifically, beneficial results are normally obtained when it is employed in an amount from 0.01% to about 5% by weight of the polymer.

As previously mentioned, one of the preferred, but optional, modifications of the invention comprises incorporating into the polymer a phenolic compound in addition to the nickel salt. The phenolic compound, when used, preferably comprises from 0.01 to 5% by weight of the polymer. Suitable phenolic compounds that are useful in this embodiment include alkyl phenols, bis-phenols, terpene phenols, aralkyl phenols, and polyalkylchromans. Typical alkyl phenols that can be used include di-tert-butyl-p-cresol, o-nonylphenol, o,o-diisopropylphenol, etc. Bisphenols that are useful include 2,2'-methylene-bis-(5-isopropylphenol), 2,2'-methylene-bis-(4-methyl-6-isopropylphenol), 2,2'-methylene-bis-(4-methyl-6-tert-butylphenol), 2,2'-methylene-bis-(4-tert-butyl-6-methylphenol), 2,2' - methylene - bis - (4,6 - di - tert - butylphenol), 2,2'-methylene - bis - (4 - nonylphenol), 2,2' - methylene-bis-(4-decylphenol), 4,4'-methylene-bis-(2,6-di-tert-butylphenol), 4,4' - methylene - bis - (2 - methyl - 6 - tert-butylphenol), 2,2'-ethylidene-bis-(4-methyl-6-tert-butylphenol), 2,2'-ethylidene-bis-(4,6-di-tert-butylphenol), 2,2'-ethylidene-bis-(4-octylphenol), 2,2'-ethylidene-bis-(4-nonylphenol), 2,2'-isopropylidene-bis-(4-methyl-6-isopropylphenol), 2,2'-isopropylidene-bis-(4-isopropylphenol), 2,2'-isopropylidene-bis-(4-isopropyl-6-methylphenol), 2,2'-isopropylidene-bis-(4-methyl-6-tert-butylphenol), 2,2'-isopropylidene-bis-(4-octylphenol), 2,2'-isopropylidene-bis-(4-nonylphenol), 2,2'-isopropylidene-bis-(4-decylphenol), 2,2'-isobutylidene-bis-(4-methyl-6-tert-butylphenol), 2,2'-isobutylidene-bis-(4-nonylphenol), etc.

Polyalkyl chromans that can be employed include 2(2'-hydroxyphenyl)-2,4,4,5',6-pentamethylchroman, 4(2'-hydroxyphenyl) - 2,2,4,5',6 - pentamethylchroman, 2(2'-hydroxyphenyl) - 5',6 - diisopropyl - 2,4,4 - trimethylchroman, 2(2'-hydroxyphenol)-5',6-diisopropyl-2,4,4,3', 8-pentamethylchroman, 2(2'-hydroxyphenyl)-5',6-di-tert-butyl-2,4,4-trimethylchroman, 4(2'-hydroxyphenyl)-5',6-di-tert-butyl-2,2,4-trimethylchroman, 2(2'-hydroxyphenyl) - 5',6 - dioctyl - 2,4,4 - trimethylchroman, 2(2' - hydroxyphenyl)-5',6-dinonyl-2,4,4-trimethylchroman, 4(2'-hydroxyphenyl)-5',6-dinonyl-2,2,4-trimethylchroman, 2-(2' - hydroxyphenyl) - 5',6 - didecyl - 2,4,4 - trimethylchroman, etc.

Terpene phenols useful in this modification are reaction products of a terpene and a phenol as exemplified by 2,6-di-isobornyl-p-cresol, 2,4-dimethyl-6-isobornylphenol, and similar products made by condensing phenol or an alkylphenol with a cyclic unsaturated terpene or dihydroterpene, e.g., camphene, carvomenthene, dipentene, α-pinene and the like.

The compositions of the invention can be prepared by any method by which solid thermoplastic polymers are blended with additives. The compositions can also contain one or more additives in addition to those already mentioned. Such other additives include, for instance, pigments, dyes, antacids, fillers and the like.

What I claim and desire to protect by Letters Patent is:
1. A stereoregular polymer of an α-olefin containing as a light stabilizer therefor from 0.01% to 5%, based on the weight of polymer, of a nickel phenolate of a compound selected from the group consisting of bis(p-alkylphenol) sulfoxides and bis(p-alkylphenol) sulfones in which the alkyl groups each contain at least 2 carbon atoms, and from 0.01% to 5%, based on the weight of polymer, of a phenolic compound selected from the group consisting of alkyl phenols, bis-phenols, terpene phenols, aralkyl phenols, and polyalkylchromans.
2. The composition of claim 1 in which the polymer is polypropylene.

References Cited in the file of this patent
UNITED STATES PATENTS

| 2,883,365 | Mathes | Apr. 21, 1959 |
| 2,970,128 | Csendes | Jan. 31, 1961 |
| 2,971,941 | Fuchsman et al. | Feb. 14, 1961 |